United States Patent [19]

Klein

[11] Patent Number: 4,904,110
[45] Date of Patent: Feb. 27, 1990

[54] FASTENING ARRANGEMENT FOR SHELVING SYSTEM OR THE LIKE

[75] Inventor: Herbert H. Klein, Arlington Heights, Ill.

[73] Assignee: Unarco Industries, Inc., Chicago, Ill.

[21] Appl. No.: 208,148

[22] Filed: Jun. 17, 1988

[51] Int. Cl.[4] .............................................. A47B 47/00
[52] U.S. Cl. ..................................... 403/379; 403/22; 403/337; 403/363; 403/388; 403/408.1; 211/191; 211/192; 411/85; 411/169; 411/398; 411/401
[58] Field of Search ............... 403/363, 378, 379, 387, 403/388, 408.1, 337, 22; 411/169, 973, 974, 398, 400, 401, 84, 85; 211/191, 192

[56] References Cited

U.S. PATENT DOCUMENTS

| 348,235 | 8/1886 | Pope . |
| 789,553 | 10/1904 | Lang . |
| 1,337,365 | 4/1920 | Madison .......................... 411/401 X |
| 1,358,688 | 11/1920 | Lyon . |
| 1,616,437 | 2/1927 | Brock . |
| 1,846,400 | 2/1932 | MacFarlane . |
| 1,955,353 | 4/1934 | Wiley . |
| 2,379,752 | 7/1945 | Schultz . |
| 2,764,266 | 9/1956 | Haworth .............................. 403/22 |
| 3,463,525 | 8/1969 | Stewart . |
| 3,545,626 | 12/1970 | Seiz . |
| 3,741,405 | 6/1973 | McConnell et al. . |
| 3,813,179 | 5/1974 | Priest . |
| 3,877,579 | 4/1975 | Weider . |
| 4,131,204 | 12/1978 | Jacoby et al. ...................... 211/192 |
| 4,448,315 | 5/1984 | Obermeyer ......................... 211/191 |
| 4,496,061 | 1/1985 | Highsmith .......................... 211/191 |
| 4,575,295 | 3/1986 | Rebentisch . |
| 4,804,288 | 2/1989 | Tiernan, Jr. ..................... 403/337 X |

Primary Examiner—Randolph A. Reese
Assistant Examiner—Franco Deliguori
Attorney, Agent, or Firm—Dressler, Goldsmith, Shore, Sutker & Milnamow Ltd.

[57] ABSTRACT

In a shelving system, a columnar post, an outer plate, and a fastening device for fastening the outer plate removably to the columnar post. The fastening device includes a bolt having a threaded shank and a transverse head, which is integral with the threaded shank, and which includes a longer portion and a shorter portion, and fastener, which is threadable onto the threaded shank. The bolt is adapted to be successively inserted through an aperture in the outer plate, inserted through an aperture in a front wall of the columnar post, rotated about the threaded shank in a clockwise sense, and drawn outwardly until the longer portion of the transverse head bears against a curved corner where the front wall merges with a lateral flange of the columnar post, so as to prevent further rotation of the bolt in a clockwise sense. The longer portion of the transverse head is conformed to the curved corner so as to bear in surface-to-surface contact against the curved corner. The longer and shorter portions of the transverse head are adapted to bear against the margin of the aperture in the front wall, when the bolt is drawn outwardly, so as to prevent axial withdrawal of the bolt. The shorter portion of the transverse head clears the curved corner when the bolt is rotated about the thread in either rotational sense. When threaded onto the threaded shank in a clockwise sense until the fastener bears against the margin of the aperture of the front wall, the fastener draws the bolt outwardly.

3 Claims, 1 Drawing Sheet

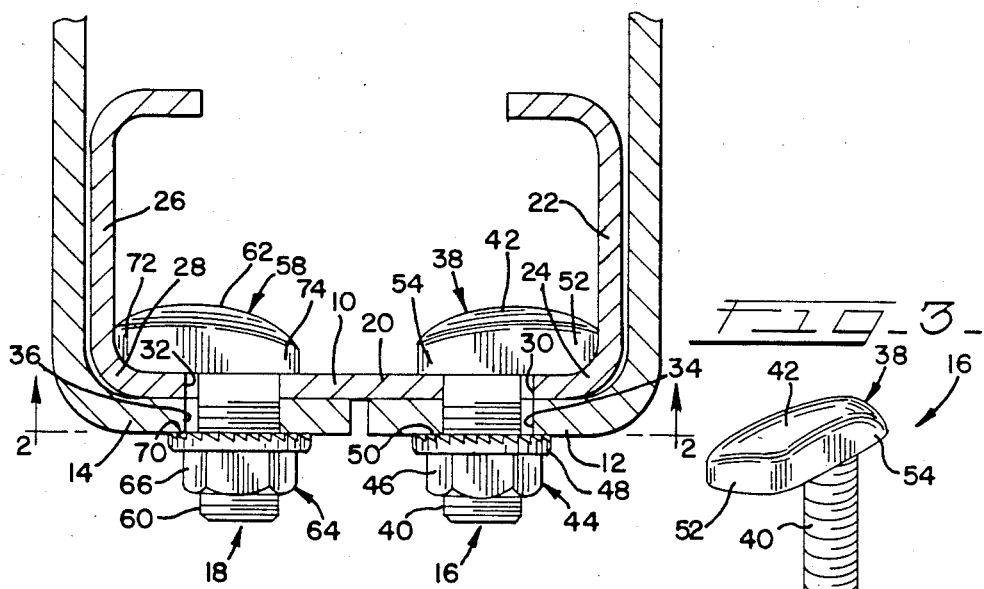

FASTENING ARRANGEMENT FOR SHELVING SYSTEM OR THE LIKE

BACKGROUND OF THE INVENTION

This invention pertains to a combination comprising a columnar post, an outer plate, and means for fastening the outer plate removably to the columnar post, particularly but not exclusively in a shelving system.

In a shelving system or the like, it is known for a columnar post to have a front wall and lateral flanges, each extending from the front wall. Moreover, it is known for an outer plate, which may have a cross-member welded thereto, to be removably fastened to the front wall by means of bolts passing through apertures in the outer plate and in the front wall. See, e.g., Highsmith U.S. Pat. No. 4,496,061. See, also, Seiz U.S. Pat. No. 3,545,626, McConnell et al. U.S. Pat. No. 3,741,405, Priest U.S. Pat. No. 3,813,179, Weider U.S. Pat. No. 3,877,579, and Jacoby et al. U.S. Pat. No. 4,131,204.

As exemplified in the several patents noted above, various types of bolts have been developed, which facilitate fastening of such a plate to such a post.

As exemplified in Highsmith U.S. Pat. No. 4,496,061, the bolt can have a shank with a non-circular cross-section, which cooperates with an aperture having an appropriate shape so as to prevent the bolt from rotating as a nut is threaded onto the bolt.

As exemplified in Priest U.S. Pat. No. 3,813,179, the bolt can have a grooved head, which cooperates with grooved portions of a structural member so as to prevent the bolt from rotating, or withdrawing, when a fastener is threaded onto the bolt. See also, Lyon U.S. Pat. No. 1,358,688, Wiley U.S. Pat. No. 1,955,353, Stewart U.S. Pat. No. 3,463,525, and Rebentisch U.S. Pat. No. 4,575,295.

As exemplified by Jacoby et al. U.S. Pat. No. 4,131,204, the bolt can have a bent shank, an inner portion of which can have edge-to-surface contact with a column flange (see FIG. 3) so as to prevent the bolt from rotating. See, also, Brock U.S. Pat. No. 1,616,437.

Bolts of related interest are exemplified in Pope U.S. Pat. No. 348,235, Lang U.S. Pat. No. 787,553, Madison U.S. Pat. No. 1,337,365, Macfarlane U.S. Pat. No. 1,846,400, Wiley U.S. Pat. No. 1,955,353, and Schultz U.S. Pat. No. 2,379,752, and in the other patents noted above.

There has remained a need, to which this invention is addressed, for an improved arrangement to fasten an outer plate, which may have a cross-member welded thereto, removably to a columnar post, in a shelving system or the like.

SUMMARY OF THE INVENTION

This invention provides, in a shelving system or the like, a combination comprising a columnar post, an outer plate, which may have a cross-member welded thereto, and means for fastening the outer plate removably to the columnar post.

The columnar post has a front wall and a lateral flange extending from the front wall and merging with the front wall along a curved corner of the columnar post. The curved corner may result from a stamping or bending operation on sheet metal, e.g., sheet steel, as used to make the columnar post. The front wall has an aperture bounded by a margin.

The outer plate has an aperture bounded by a margin, similar to the aperture of the front wall, and adapted to overlie the aperture of the front wall when the outer plate is disposed for being fastened to the front wall. The outer plate may be also made of sheet metal, e.g., sheet steel.

The fastening means includes a bolt having a threaded shank and a transverse head, which is integral with the threaded shank, and a fastener, such as a nut having a toothed bearing surface, which is threadable onto the threaded shank. The bolt is adapted to be successively inserted through the aperture in the outer plate, inserted through the aperture in the front wall, rotated about the threaded shank in a given rotatable sense, e.g., in a clockwise sense, in relation to the columnar post, and drawn outwardly until the transverse head bears against the curved corner where the lateral flange merges with the front wall so as to prevent further rotation of the bolt in the same rotational sense. The transverse head is conformed to such corner so as to bear in surface-to-surface contact with such corner. The transverse head is adapted to bear against the margin of the aperture in the front wall, when the bolt is drawn outwardly, so as to prevent axial withdrawal of the bolt. The fastener, which is threadable onto the threaded shank, is adapted to draw the bolt outwardly, when the fastener is threaded onto the threaded shank, until the fastener bears against the margin of the aperture of the outer plate.

In a preferred construction, the transverse head of the bolt has a longer portion, which is adapted to bear against the curved corner where the lateral flange merges with the front wall, and which is conformed to such corner so as to bear in surface-to-surface contact with such corner, and a shorter portion, which is adapted to clear such corner when the bolt after having been so inserted is rotated about the threaded shank in either rotational sense in relation to the columnar post. Moreover, the longer and shorter portions are adapted to bear against the margin of the aperture in the front wall, on opposite sides of such aperture, when the bolt after having been so inserted, and after having been rotated about the threaded shank in the given rotational sense mentioned above, bears at the longer portion against such corner.

In the preferred construction, the apertures are shaped as parallelograms, but not as rectangles, so as to allow straight-through insertion of the bolt in relation to the threaded shank. There is no need, therefore, for the bolt to be pivotally inserted through the successive apertures.

These and other objects, features, and advantages of this invention will be evident from the following description of a preferred embodiment of this invention, with reference to the accompanying drawing.

BRIEF DESCRIPTION OF THE DRAWING

FIG. 1 is a cross-sectional view looking downwardly, as taken through a columnar post, two outer plates, and means for fastening the outer plates removably to the columnar post, in a combination constituting a preferred embodiment of this invention.

FIG. 2 is a fragmentary view of the combination of FIG. 1, partly in a section taken along line 2—2 of FIG. 1 in a direction indicated by arrows.

FIG. 3 is an exploded, perspective view of one of the fastening means shown in FIGS. 1 and 2.

DETAILED DESCRIPTION OF PREFERRED EMBODIMENT

As shown in FIGS. 1 and 2, a shelving system comprises a columnar post 10, which is generally U-shaped in cross-section, and a pair of outer plates 12, 14, which are L-shaped in cross-section, and which are fastened removably to the columnar post 10 by a pair of fastening means 16, 18, one of which also is shown in FIG. 3. The corner post 10 and the outer plates 12, 14, may be fabricated from sheet steel.

A cross-member (not shown) may be welded to each of the outer plates 12, 14, in a known manner. See, e.g., Highsmith U.S. Pat. No. 4,496,061.

The columnar post 10 has a front wall 20, a lateral flange 22 extending from the front wall 20 and merging with the front wall 20 along a curved corner 24 of the columnar post 10, along its right side, as shown, and a lateral flange 26 extending from the front wall 20 and merging with the front wall 20 along a curved corner 28 of the columnar post 10, along its left side, as shown. The outer plate 12 is fastened removably to the front wall 20 by the fastening means 16. The outer plate 14 is fastened removably to the front wall 20 by the fastening means 18.

The front wall 20 has a pair of elongate apertures 30, 32, which are shaped as parallelograms, but not as rectangles, and which are similar to each other. The outer plate 12 has an elongate aperture 34, which is shaped similarly, and which is adapted to overlie the aperture 30 when the outer plate 12 is disposed for being fastened to the front wall 20. The outer plate 14 has an elongate aperture 36, which is shaped similarly, and which is adapted to overlie the aperture 32 when the outer plate 14 is disposed for being fastened to the front wall 20. Each of the apertures 30, 32, 34, 36, is bounded by a margin.

As a representative example of the fastening means 16, 18, which are similar to each other, the fastening means 16, which may be machined from a bar of steel stock, includes a bolt 38 having a threaded shank 40 and a transverse head 42, which is integral with the threaded shank 40, and further includes a fastener 44, which is threadable onto the threaded shank 40. As shown, the fastener 44 has a hexagonal body 46, which accommodates a conventional wrench (not shown) or other torque-applying tool, and an integral washer 48 having a toothed bearing surface 50, which bears against the outside of the margin of the aperture 36 of the outer plate 14 when the fastening means 16 is used to fasten the outer plate 14 to the front wall 20.

The transverse head 42 has a longer portion 52 and a shorter portion 54. The aperture 34 of the outer plate 12 and the aperture 30 of the front wall 20 of the columnar post 10 are shaped, as described above, so as to allow straight-through insertion of the bolt 38 axially in relation to the threaded shank 40 with the transverse head 42 preceding the threaded shank 40. Thus, the bolt 38 is adapted to be successively inserted through the aperture 34 of the outer plate 12, inserted through the aperture 30 of the front wall 20 of the columnar post 20, rotated about the threaded shank 40 in a clockwise sense, as shown in FIG. 2, in relation to the columnar post 10, and drawn outwardly until the longer portion 52 of the transverse head 42 bears against the curved corner 24 where the lateral flange 22 merges with the front wall 20. The longer portion 52 is conformed to such corner 24 so as to bear in surface-to-surface contact with such corner 24, as contrasted with edge-to-surface or other contact. The shorter portion 54 is adapted to clear such corner 24 when the bolt 38, as inserted through the aperture 34 of the outer plate 12 and through the aperture 30 of the front wall 20, is rotated about the threaded shank 40 in either a clockwise sense or a counterclockwise sense in relation to the columnar post 10. Moreover, the longer portion 52 and the shorter portion 54 are adapted to bear against the inside of the margin of the aperture 30 of the front wall 20, on opposite sides of such aperture 30, when the bolt 38, as inserted through the aperture 34 of the outer plate 12 and through the aperture 30 of the front wall 20 and rotated about the threaded shank 40 in a clockwise sense, as described above, bears at the longer portion 52 against such corner 24.

Similarly, the fastening means 18 includes bolt 58 having a threaded shank 60 and a transverse head 62, as well as a fastener 64, which has a hexagonal body 66 and an integral washer 68 providing a toothed bearing surface 70. The transverse head has a longer portion 72, which conforms to the curved corner 28 where the lateral flange 26 merges with the front wall 20, and a shorter portion 74. Since the fastening means 16, 18, are similar to each other and function similarly, further description of the fastening means 18 would be essentially duplicative and has been omitted.

Because there is surface-to-surface contact between the longer portion 52 of the transverse head 42 of the bolt 38 and the curved corner 24 where the lateral flange 22 merges with the front wall 20 and because there is surface-to-surface contact between the longer portion 70 of the transverse head 62 of the bolt 58 of the fastening means 18, the fastening means 16, 18, do not tend to dig into the columnar post 10.

Various changes may be made in the combination described above without departing from the scope and spirit of this invention.

I claim:

1. In a shelving system or the like, a combination comprising:
   (a) a columnar post, which has a front wall and a lateral flange extending from the front wall and merging with the front wall along a curved corner of the columnar post, the curved corner defining a concavely curved bearing surface, the front wall having an aperture bounded by a margin;
   (b) an outer plate, which is adapted to be removably fastened to the front wall, and which has an aperture bounded by a margin, similar to the aperture of the front wall, and adapted to overlie the aperture of the front wall when the outer plate is disposed for being fastened to the front wall;
   (c) means for fastening the outer plate removably to the front wall, said means including:
      (1) a bolt having a threaded shank and a transverse head, which is integral with the threaded shank, the transverse head having two opposite portions and being smaller than the aperture in the outer plate and smaller than the aperture in the front wall, the bolt being adapted to be successively inserted through the aperture of the outer plate with the head preceding the shank, inserted through the aperture of the front wall with the head preceding the shank, rotated about the threaded shank in a given rotational sense in relation to the columnar post, and drawn outwardly until the transverse head bears against the curved corner where the lateral flange merges with the front wall so as to prevent further rotation of the bolt in the same rotational sense, the apertures being shaped so as to allow substantially straight-through insertion of the bolt axially in relation to the threaded shank with the head preceding the shank, one of said two opposite portions of the transverse head having a convexly curved bearing surface conformed to the concavely curved bearing surface defined by said corner so as to bear in surface-to-surface contact with said concavely curved bearing surface, the transverse head being adapted to bear at the opposite portions against the margin of the aperture in the front wall, on opposite sides of the aperture in the front wall, when the bolt is drawn outwardly, so as to prevent axial withdrawal of the bolt; and (2) a fastener, which is threadable onto the threaded shank, and which is adapted to draw the bolt outwardly, when the fastener is threaded onto the threaded shank, until the fastener bears against the margin of the aperture of the outer plate.

2. The combination of claim 1 wherein said one of said two opposite portions of the transverse head of the bolt comprises a longer portion, which is adapted to bear against the curved corner where the lateral flange merges with the front wall, and the other of said two opposite portions comprises a shorter portion, which is adapted to clear said corner when the bolt after having been inserted successively through the aperture of the outer plate and through the aperture of the front wall with the head preceding the shank is rotated about the threaded shank in either rotational sense in relation to the columnar post, the bolt after having been so inserted, and after having been rotated about the threaded shank in the given rotational sense in relation to the columnar post, bearing at the longer portion against said corner.

3. The combination of claim 2 wherein the apertures are shaped as parallelograms, but not as rectangles.

* * * * *